United States Patent
Song et al.

(10) Patent No.: US 10,241,839 B2
(45) Date of Patent: Mar. 26, 2019

(54) METHOD AND SYSTEM FOR GENERATING A VIRTUAL DEVICE RESOURCE ACCESSIBLE BY AN APPLICATION

(71) Applicant: NEC EUROPE LTD., Heidelberg (DE)

(72) Inventors: JaeSeung Song, Sungnam-si (KR); Martin Bauer, Eppelheim (DE); Barbara Pareglio, London (GB)

(73) Assignee: NEC CORPORATION, Tokyo (JP)

( * ) Notice: Subject to any disclaimer, the term of this patent is extended or adjusted under 35 U.S.C. 154(b) by 392 days.

(21) Appl. No.: 14/916,582

(22) PCT Filed: Feb. 10, 2014

(86) PCT No.: PCT/EP2014/052556
§ 371 (c)(1),
(2) Date: Mar. 4, 2016

(87) PCT Pub. No.: WO2015/082083
PCT Pub. Date: Jun. 11, 2015

(65) Prior Publication Data
US 2016/0217013 A1    Jul. 28, 2016

(30) Foreign Application Priority Data

Dec. 4, 2013  (EP) .................................... 13195743

(51) Int. Cl.
*G06F 17/30*    (2006.01)
*G06F 9/50*    (2006.01)

(52) U.S. Cl.
CPC .......... *G06F 9/5077* (2013.01); *G06F 9/5011* (2013.01); *G06F 17/30424* (2013.01); *G06F 17/30477* (2013.01)

(58) Field of Classification Search
CPC ................ G06F 9/5077; G06F 9/5011; G06F 17/30477; G06F 17/30424
(Continued)

(56) References Cited

U.S. PATENT DOCUMENTS 8,255,871 B1 *  8/2012  Kompella ................. G06F 8/61
                                                           717/108
8,751,626 B2 *  6/2014  Pinkston .................. G06F 9/546
                                                           709/223

(Continued)

OTHER PUBLICATIONS

"Analytics", Wikipedia, downloaded from: en.wikipedia.org/Analytics on Jun. 20, 2018, pp. 1-6.*

*Primary Examiner* — Robert Stevens
(74) *Attorney, Agent, or Firm* — Leydig, Voit & Mayer, Ltd.

(57) ABSTRACT

A method for generating a virtual device resource (VDR) accessible by an application includes providing a request for discovery of information by one or more applications; converting the provided request into one or more requests for one or more BigData repositories, wherein the converted one or more requests are supported by the one or more BigData repositories and fit the provided request; transmitting the converted one or more requests to the one or more BigData repositories; executing the transmitted one or more requests resulting in one or more descriptions of virtual device resources; selecting one or more virtual device resources (VDR) based on the one or more descriptions; and generating the selected, one or more virtual device resources (VDR).

12 Claims, 5 Drawing Sheets

(58) Field of Classification Search
USPC .......................................................... 707/769
See application file for complete search history.

(56) References Cited

U.S. PATENT DOCUMENTS

| | | | |
|---|---|---|---|
| 8,996,583 B2 * | 3/2015 | Chen | G06F 17/30398 |
| | | | 707/797 |
| 9,098,803 B1 * | 8/2015 | Todd | G06N 5/02 |
| 9,594,849 B1 * | 3/2017 | Todd | G06F 17/30943 |
| 9,684,866 B1 * | 6/2017 | Todd, Jr. | G06N 5/02 |
| 10,114,680 B2 * | 10/2018 | Wang | H04L 67/18 |
| 2004/0044769 A1 | 3/2004 | Tanaka | |
| 2009/0193426 A1 | 7/2009 | Bernabeu-Auban et al. | |
| 2011/0238650 A1 * | 9/2011 | Jenkins | G06F 17/30011 |
| | | | 707/706 |
| 2014/0336786 A1 * | 11/2014 | Asenjo | G05B 19/4185 |
| | | | 700/17 |
| 2015/0341230 A1 * | 11/2015 | Dave | H04L 41/5058 |
| | | | 705/7.29 |

* cited by examiner

METHOD AND SYSTEM FOR GENERATING A VIRTUAL DEVICE RESOURCE ACCESSIBLE BY AN APPLICATION

CROSS REFERENCE TO RELATED APPLICATIONS

This application is a U.S. National Stage Application under 35 U.S.C. § 371 of International Application No. PCT/EP2014/052556 filed on Feb. 10, 2014, and claims benefit to European Patent Application No. EP 13195743.3 filed on Dec. 4, 2013. The International Application was published in English on Jun. 11, 2015 as WO 2015/082083 A1 under PCT Article 21(2).

FIELD

The present invention relates to a method for generating a virtual device resource accessible by an application, for example a machine-to-machine application. The present invention further relates to a system for generating a virtual device resource accessible by an application, for example a machine-to-machine application.

BACKGROUND

Machine-to-machine technology is undergoing a transformation from proprietary, vertical-market segment solutions to horizontal platforms with applications in multiple usage areas, for example market segments. A much broader collection of data which can be subjected to data-mining for adding more value than current vertical-integrated solutions is enabled. However, a handling of this so-called "BigData", which is in the order of Petabytes, Exabytes or an even higher order is difficult. For example, a fast integration, filtering and abstraction for multiple application areas ranging from e-health to agriculture or energy-saving to distributed-manufacturing is one of the problems.

One of the conventional machine-to-machine technologies is so-called oneM2M standardizing a common M2M service platform for reducing fragmentation and enabling faster integration and growth of applications. Similarly BigData platforms respectively BigData repositories are also fragmented and have also to be evolved to a common BigData platform, such as that depicted in FIG. 1.

Many machine-to-machine service providers and operators intend to operate machine-to-machine platforms as well as BigData platforms respectively BigData repositories. Therefore, integration of BigData platforms and machine-to-machine platforms is desired to enable mashed-up applications.

SUMMARY

In an embodiment, the present invention provides a method for generating a virtual device resource accessible by an application, the method including providing a request for discovery of information by one or more applications; converting the provided request into one or more requests for one or more BigData repositories, wherein the converted one or more requests are supported by the one or more BigData repositories and fit the provided request; transmitting the converted one or more requests to the one or more BigData repositories; executing the transmitted one or more requests resulting in one or more descriptions of virtual device resources; selecting one or more virtual device resources based on the one or more descriptions; and generating the selected one or more virtual device resources.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable to storage in general, the present invention will be described herein below with regard to BigData repositories. Although applicable to data of any size, the present invention will be described herein below with regard to BigData, preferably of size in the range of Petabytes, Exabytes, and above. Although applicable to applications in general, the present invention will be described herein below with regard to machine-to-machine applications.

In an embodiment, the present invention provides a method and a system enabling an efficient and a seamless integration of BigData and machine-to-machine applications, so that an application can utilize data from both platforms. In an embodiment, the present invention enables an application to access information in a uniform way.

In an embodiment, a method for generating a virtual device resource accessible by an application, preferably a machine-to-machine application, is defined which is characterized by the steps of a) Providing a request for discovery of information by one or more applications, b) Converting the provided request into one or more requests for one or more BigData repositories, wherein the converted one or more requests are supported by the one or more BigData repositories and fit the provided request, c) Transmitting the converted one or more requests to the one or more BigData repositories, d) Executing the transmitted one or more requests resulting in one or more descriptions of virtual device resources, e) Selecting one or more virtual device resources based on the one or more descriptions, and f) Generating the selected one or more virtual device resources.

In an embodiment, a system is provided for generating a virtual device resource accessible by an application, preferably a machine-to-machine application, connectable to one or more BigData repositories. An embodiment is characterized by application means on which the application is executed and operable to provide a request for discovery of information and to select one or more virtual device resources based on one or more descriptions, request converting means operable to convert the requested into one or more requests for the one or more BigData repositories, wherein the converted one or more requests are supported by the one or more BigData repositories and fit the provided request, transmission means operable to transmit the converted one or more requests to the one or more BigData repositories, execution means operable to execute the transmitted one or more requests resulting in one or more descriptions of virtual device resources and generating means operable to generate the selected one or more virtual device resources.

According to an embodiment of the invention it has been recognized that an efficient and seamless discovery and negotiation mechanism for an application enabling integrating BigData repositories into a machine-to-machine system is provided by the use of the generated virtual device resources which enable in particular analytics on data of the BigData repositories.

According to an embodiment of the invention it has been further recognized that flexibility is enhanced since options for generating a virtual device resource can be used according to the discovered information being requested by applications.

According to an embodiment of the invention it has been further recognized that flexibility is further enhanced by enabling a dynamic creation of virtual device resources by requesting them based on the discovered information.

According to an embodiment of the invention it has been even further recognized that also the creation of machine-to-machine applications can be simplified when making use of BigData repositories.

The term "virtual device resource" is in particular in the description, preferably in the claims, a place holder to keep a service logic utilizing analytics and BigData. Within a machine-to-machine system or platform such a "virtual device resource" is preferably considered similar or equivalent to any other resource representing device information like an application resource. The term "virtual device resource" is preferably not to be understood as a virtual resource according to some machine-to-machine standard specifications, for example ETSI, oneM2M or the like.

A "device resource" according to the invention can preferably be handled in machine-to-machine platforms similarly or even identically to conventional application resources representing specific function of a device: For example a "device resource" can generate new values like sensor values, accept commands signaling to carry out operations like actuators or the like.

The term "BigData" is in particular in the description, preferably in the claims to be understood in the broadest sense, i.e. the term "BigData" refers to any data of any size. Preferably the term BigData refers to data of Petabyte size, Exabyte size or above.

According to a preferred embodiment at least step f), preferably steps b)-f), are performed only when a predetermined number of same request for discovery of information within a predefined time period exceeds a predetermined threshold. This enables to enhance efficiency when creating or generating device resources: Only when a certain frequency of requests is exceeded the virtual device resource is created.

According to a further preferred embodiment the request for discovery of information is provided to a discovery common service function for performing step b). This enables an easy integration of the invention into a oneM2M-compatible platform.

According to a further preferred embodiment device resource information is added to the generated one or more virtual device resources, preferably a TTL value. A TTL value is a value indicating the time to live, i.e. how long this generated virtual device resource will exist in a resource tree for example. This further enhances the efficiency, since after a certain period reserved resources for the virtual device resource are deallocated and may then be provided to other virtual device resources. Further flexibility is enhanced, since by adding device resource information, e.g. meta-data certain properties of the generated virtual device resource can be implemented or indicated to an application requesting the virtual device resource.

According to a further preferred embodiment step d) and/or step f) is performed by a discovery function, preferably a discovery common service function. By using a discovery common service function on the one hand an easy integration into oneM2M compatible platforms is enabled and on the other hand an efficient handling between the one or more BigData repositories and the machine-to-machine application is provided.

According to a further preferred embodiment the generation of the one or more virtual device resources is acknowledged to the application. This enables a reliable and efficient generation: For example when the application does not receive an acknowledgement then the application may perform an unnecessary—further request for the same discovery of information so that the virtual device resource is created again although the virtual device resource has already been generated. Thus, resources can be saved.

According to a further preferred embodiment one or more virtual device resources provide analytics of the one or more BigData repositories. This enables a machine-to-machine service provider having access to one or more BigData repositories to provide BigData analytics to all machine-to-machine application users. Further the provider is enabled to create new business opportunities by using the one or more BigData platforms: A virtual device resource then comprises service logics for the new business. Such a virtual device resource can then be created in the machine-to-machine platform and the virtual device resource then may work in the same way as any other application resource type.

According to a further preferred embodiment the analytics are provided in form of a resource or attribute, preferably wherein the analytics are provided as a set of one or more resources within the same virtual device resource. Therefore an easy implementation also of the analytics into a machine-to-machine system, preferably into a conventional oneM2M platform, is enabled.

According to a further preferred embodiment for providing the analytics resource or attribute, analytics results, a corresponding query, association information, one or more filtering rules and/or a semantic description is provided. This allows to efficiently describe the resource or attribute and to perform the analytics. The query may specify the BigData analysis to be performed on the BigData repository. For example filtering rules can be used to filter results provided by a BigData repository to provide the results which are requested by the machine-to-machine application. Semantic description can be added to results provided by analytics resource or attribute to provide meta-data information of the analytics to the machine-to-machine application, e.g. the type of algorithm for providing an average on the analysed data. Even further semantic description can be used to add meta-data to the resource itself, providing information about the resource or attribute for the machine-to-machine application.

According to a further preferred embodiment the analytics result is updated upon explicit request and/or periodically. This ensures that—in case the analytics result is updated periodically—updated analytics are provided automatically. Alternatively or additionally the analytics can be updated upon explicit request by an application to make sure that always the newest analytics result is available for the application.

According to a further preferred embodiment step e) comprises the steps of transmitting the one or more descriptions to the application and transmitting the selected descriptions to the discovery function for performing step f). This allows the application to chose the corresponding one or more discovery resources based on the converted requests.

According to a further preferred embodiment already performed discovery requests are analysed to foresee future discovery requests. This enables to provide corresponding virtual device resources in a much faster way. For example when requesting analytics with regard to energy consumption in the second floor of a building, then in the third floor, then in the fourth floor, it is likely that in the future the analytics of energy consumption in the other floors of the building are requested. Then the corresponding analytics and/or the corresponding virtual device resource may be already requested, kept ready and/or generated.

Figure 1:
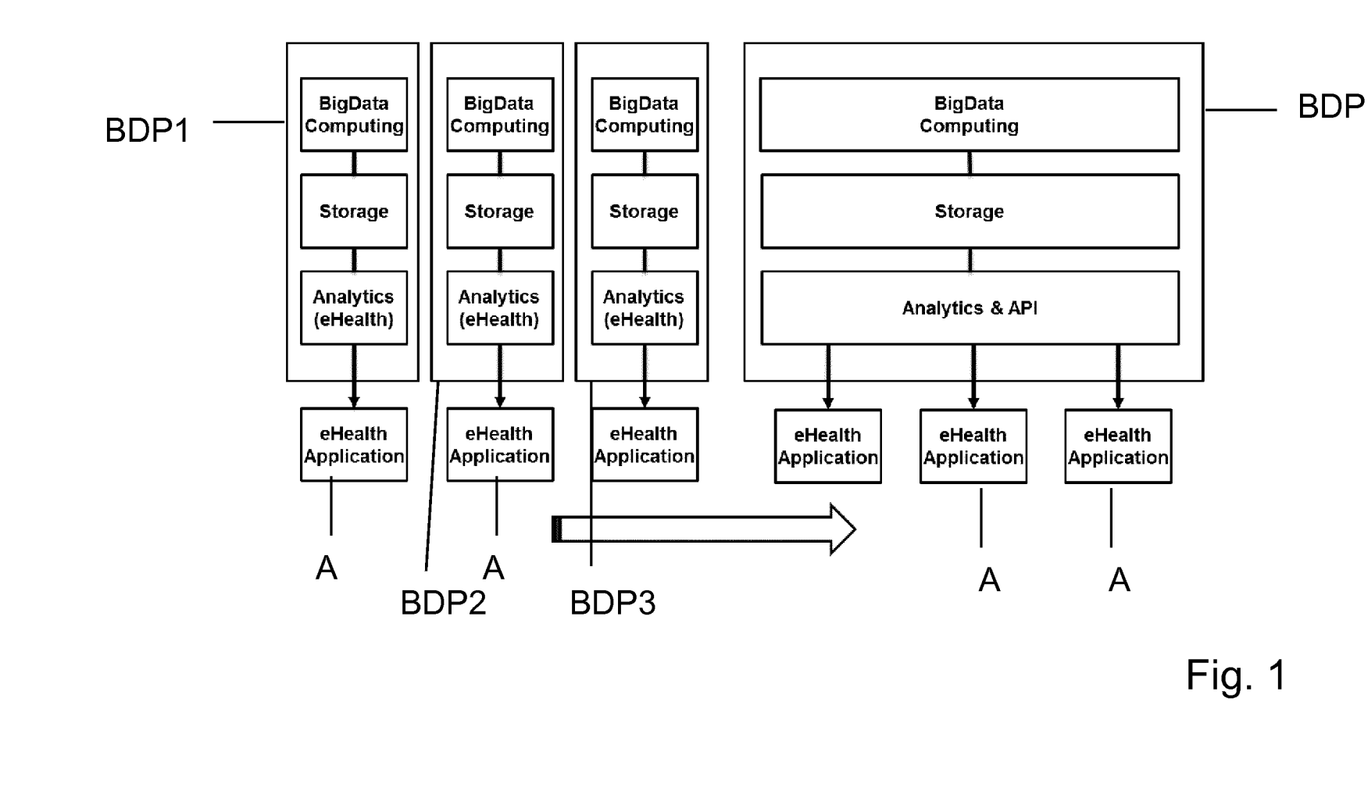
FIG. 1 shows current BigData trends.

FIG. 1 shows current BigData trends. In FIG. 1 a recent trend in BigData repositories is shown. On the left side of FIG. 1 different BigData platforms BDP1, BDP2 and BDP3 are each interacting separately with an application, for example an e-health application A. These fragmented BigData platforms BDP1, BDP2 and BDP3 are evolved to a common BigData platform BDP on the right side of FIG. 1 which interacts with each e-health application A.

Figure 2:
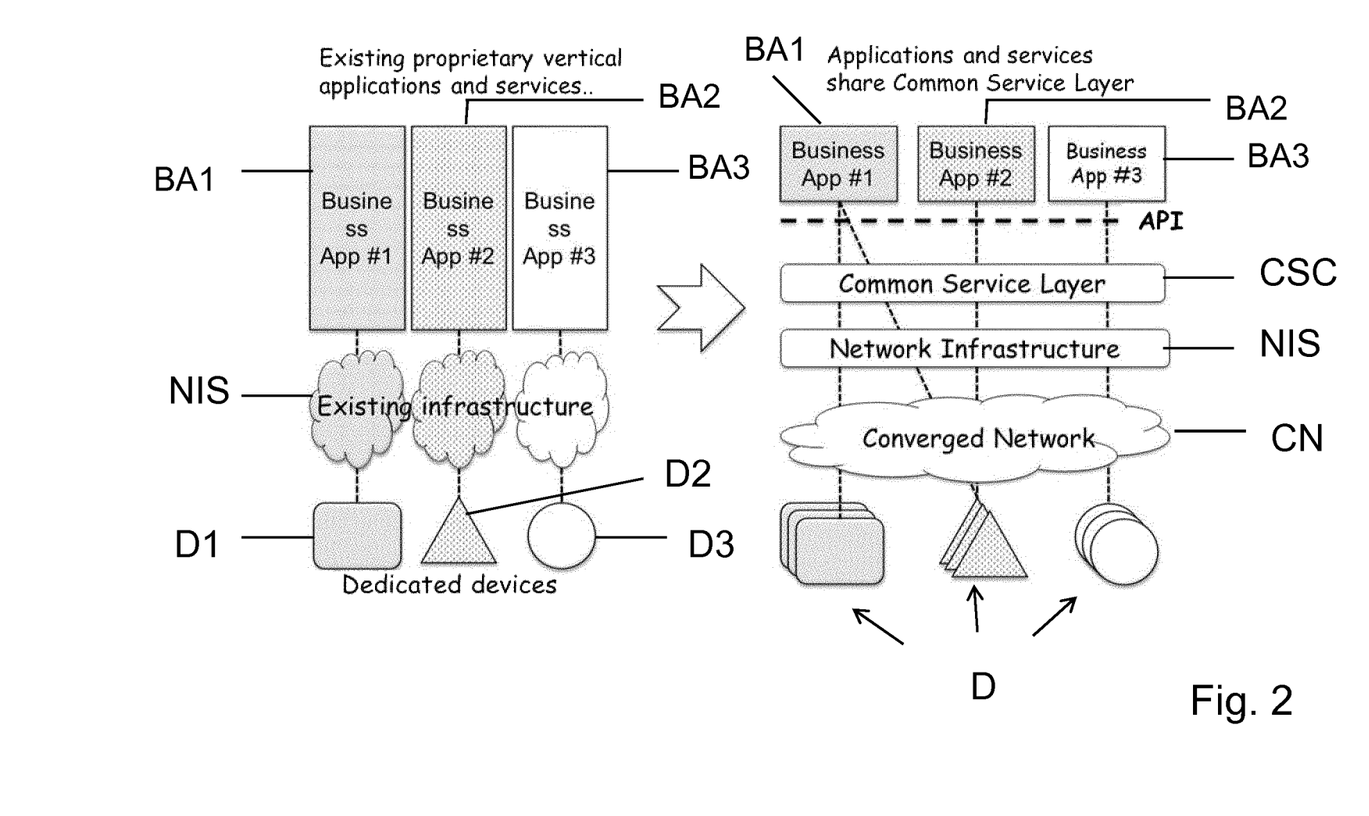
FIG. 2 shows current machine-to-machine trends.

FIG. 2 shows current machine-to-machine trends. In FIG. 2 a current trend in machine-to-machine systems in shown. On the left side of FIG. 2 existing propriety "vertical" business applications BA1, BA2, BA3 and services are shown. Each business application BA1, BA2, BA3 uses its own infrastructure NIS to interact with dedicated devices D1, D2, D3. On the right side of FIG. 2 the business applications BA1, BA2, BA3 use an application programming interface API and contact the devices D via a common service layer CSL, a common network infrastructure NIS and a converged network CN.

Figure 3:
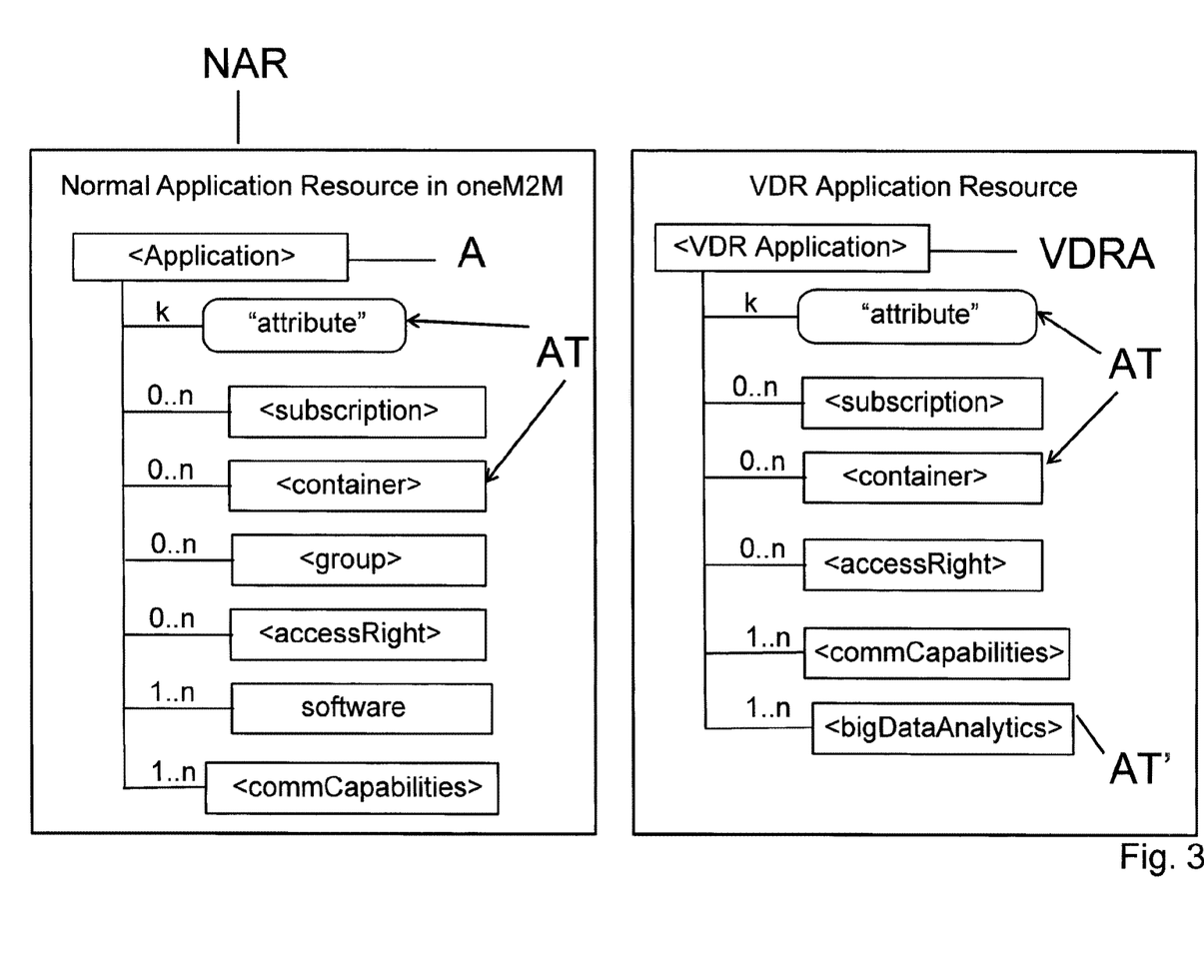
FIG. 3 shows a conventional application resource compared with a virtual device resource according to a first embodiment of the present invention.

FIG. 3 shows in comparison a conventional application resource compared with a virtual device resource according to a first embodiment of the present invention. In FIG. 3 on the left side a normal application resource NAR in a oneM2M platform is shown. An application A has several attributes AT, for example "subscription", "container", "group", "access right", "software" and "capabilities". On the right side of FIG. 3 a virtual device resource application resource according to a first embodiment of the present invention is shown. The virtual device resource application VDRA has also several attributes, however the VDR application VDRA comprises the attribute AT' named "BigData analytics". This place holder of "BigData analytics" can be implemented either as a resource or an attribute. Moreover, the place holder of "BigData analytics" can also be a set of multiple resources within the same virtual device resource VDR.

The information describing either the resource or attribute for performing analytics can be, for example:

- the result of the analytics. This value may be updated either by means of an explicit request and/or periodically,
- the query which can be performed in SQL, no SQL or in an abstract meta form, etc. for performing analytics,
- the virtual device resource application VDRA may have an association with a target address of where the queries should be sent to,
- one or more filtering rules, for example used to define how to filter data from the BigData platform or repository, and
- a semantic description, for example for adding semantic information to the result of the analytics and/or to add semantic information for the analytics itself.

Therefore a machine-to-machine service provider having access to BigData repositories is able to provide BigData analytics to all machine-to-machine users with the virtual device resource application resource. This enables the service provider to create new business opportunities by using the BigData platform with the BigData analytics by generating a new virtual device resource VDR comprising service logic for the new business. This new device resource VDR can be created in the machine-to-machine platform and may work in the same way as any other application resource type. Such a virtual device resource application VDRA may comprise one or more BigData queries to perform analytics upon the resource or attribute receiving a request.

The virtual device resource application VDRA may perform the analytics periodically to have up-to-date analytics results, for example an internal function performing analytics and updating the value of the virtual device resource can be implemented. Further a virtual device resource application VDRA may have an internal interface with analytics and the BigData repository, i.e. its internal platform to derive update relevant information. For example the virtual device resource application resource shown on the right side of FIG. 3 can be generated statically or dynamically.

In the static case a BigData provider may create virtual device resources VDR for common queries it wants to support on its data, for example for supporting a specific application. Usually a BigData provider knows all about its stored BigData and how to handle the information efficiently. For example if the BigData provider would like to expose a new service or application utilizing some data set in its BigData, a corresponding virtual device resource can be generated statically. Such a static virtual device resource VDR may contain one or more predefined BigData queries and address of the BigData server to send the queries to.

On the other hand virtual device resources VDR can be created dynamically. In this case the virtual device resources are initially not created in a resource tree. The virtual device resources VDR are created based on requests from applications, preferably together with other conditions such as frequencies of the same request or the like. Machine-to-machine platforms may have the capability to generate queries to the large amount of data sets. A request from an application may then be converted to queries performing BigData analytics. These queries may then be used to create or initiate virtual device resources VDR based on service provider's criteria or policies or the like.

Figure 4:
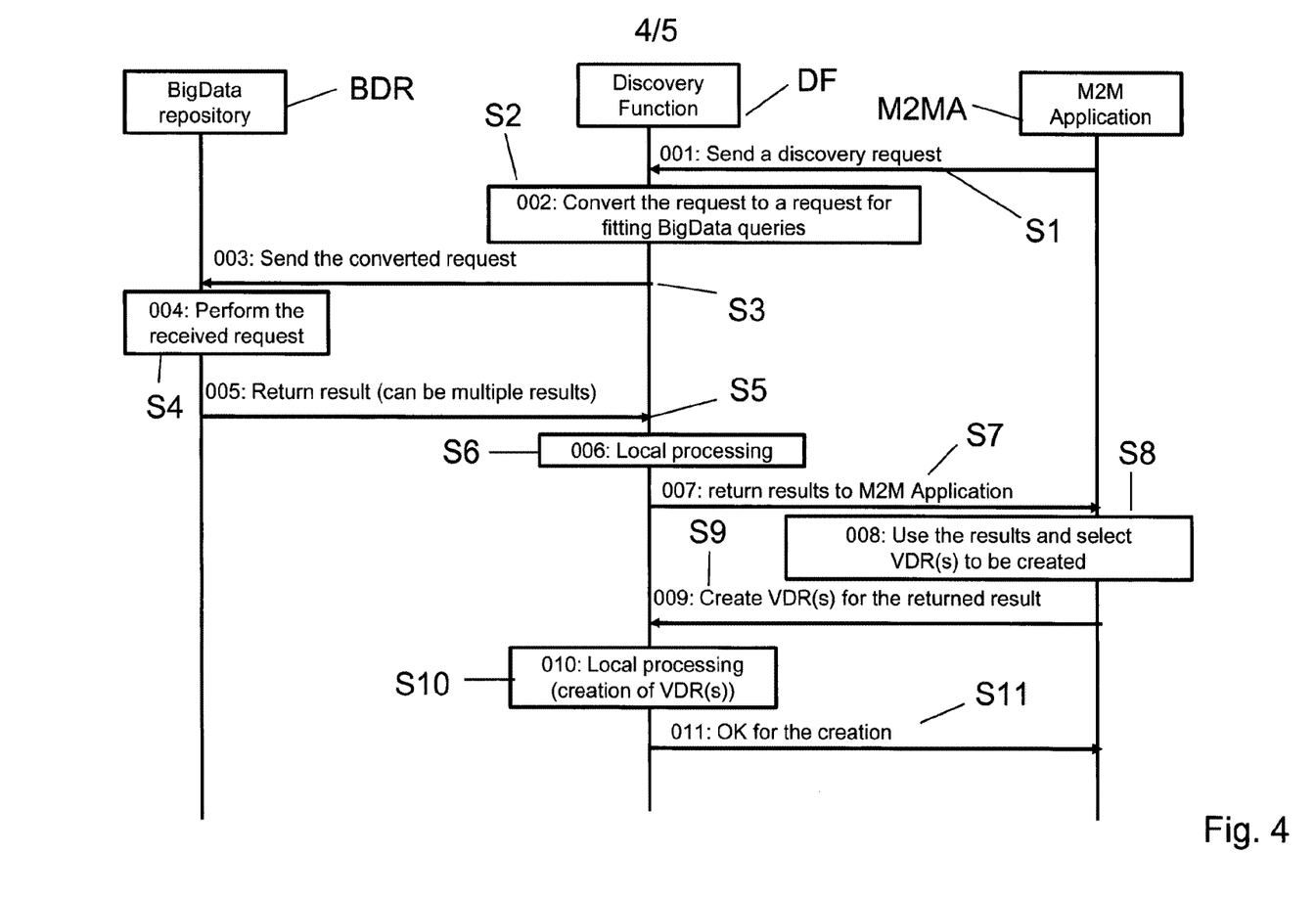
FIG. 4 shows steps of a method according to a second embodiment of the present invention.

FIG. 4 shows in detail the dynamic generation of such virtual device resources VDR. FIG. 4 shows steps of a method according to a second embodiment of the present invention. In FIG. 4 a dynamic virtual device resource creation flow is shown.

In a first step S1 an M2M application M2MA sends a discovery request to a discovery function DF in a machineto-machine platform. In case of an underlying oneM2M system the discovery function DF is a discovery common service function.

In a second step S2 the discovery function DF converts the received discovery request into one or more requests to one or more BigData repositories BDR. The requests pertain to BigData queries fitting the original requests from the machine-to-machine application M2MA that could be supported by the respective BigData repository BDR.

In a third step S3 the discovery function then sends the converted query or queries to one or more BigData repositories. In case of multiple repositories the query or queries can be sent to these multiple repositories.

In a fourth step S4 the BigData repository BDR performs analytics based on the received one or more queries.

In a fifth step S5 the BigData repository BDR returns the result or results to the discovery function DF, in particular the specific queries fitting the request that can be supported by the BigData repository BDR. The discovery function DF can receive multiple results from multiple BigData repositories BDR.

In a sixth step S6 the discovery function DF performs local processing to convert the received results into descriptions of dynamically creatable virtually device resources VDR.

In a seventh step S7 the discovery function DF returns the results to the M2M application M2MA.

In an eighth step S8 the machine-to-machine application M2MA uses the results to select the one or more virtual device resources VDR to be created.

In a ninth step S9 the machine-to-machine application M2MA requests the creation of the selected one or more virtual device resources VDR to the discovery function DF.

In a tenth step S10 the discovery function DF creates the requested one or more virtual device resources VDR based on the underlying BigData query or queries and corresponding one or more BigData repositories BDR.

Optionally, in an eleventh step S11 after the creation of the requested one or more virtual device resources VDR, the discovery function DF sends an acknowledgement message to the machine-to-machine application M2MA.

The creation of a virtual device resource VDR can be initiated by the discovery function DF, for example based on the frequency of the same request or the like.

In summary of FIG. 4 the discovery function or more specifically in the following the discovery common service function in a oneM2M system receives a request from an application M2MA for discovery of information/resources. The discovery common service function D-CSF then sends a query to the device management and repository common service function DMR-CSF to get results from managing resources. Since the device management and repository common service function DMR-CSF comprises an interface to one or more BigData platforms, the device management and repository common service function DMR-CSF checks what kind of results can be returned from a large amount of data set. An analytic sub-function either in BigData platforms BDR or in the device management and repository common service function DMR-CSF returns various potential virtual devices based on its data sets that could be instantiated as virtual device resources VDR if desired by the requesting application M2MA.

For instance, an application may request "temperature" && "Heidelberg" and the BigData analytics can return several suggestions for possible virtual device resources VDR, for example "annual temperature of Heidelberg", "summer temperature of Heidelberg", "seven days expected temperature of Heidelberg" or the like. The requested BigData platform BDR comprises the capabilities and/or logics to provide these results based on the data sets of the BigData platform BDR. As a result of a negotiation between the machine-to-machine system and the machine-to-machine application M2MA, e.g. one of the business applications BA1, BA2, BA3, the machine-to-machine applications BA1, BA2, BA3 may select one or more of the returned suggestions for generation of a virtual device resource VDR, for example the virtual device resource VDR "seven days expected temperature of Heidelberg" may be selected.

The selected virtual device resource VDR is then instantiated or created within a infrastructure node common service entity IN-CSE for further usages by this and potential other applications.

Figure 5:
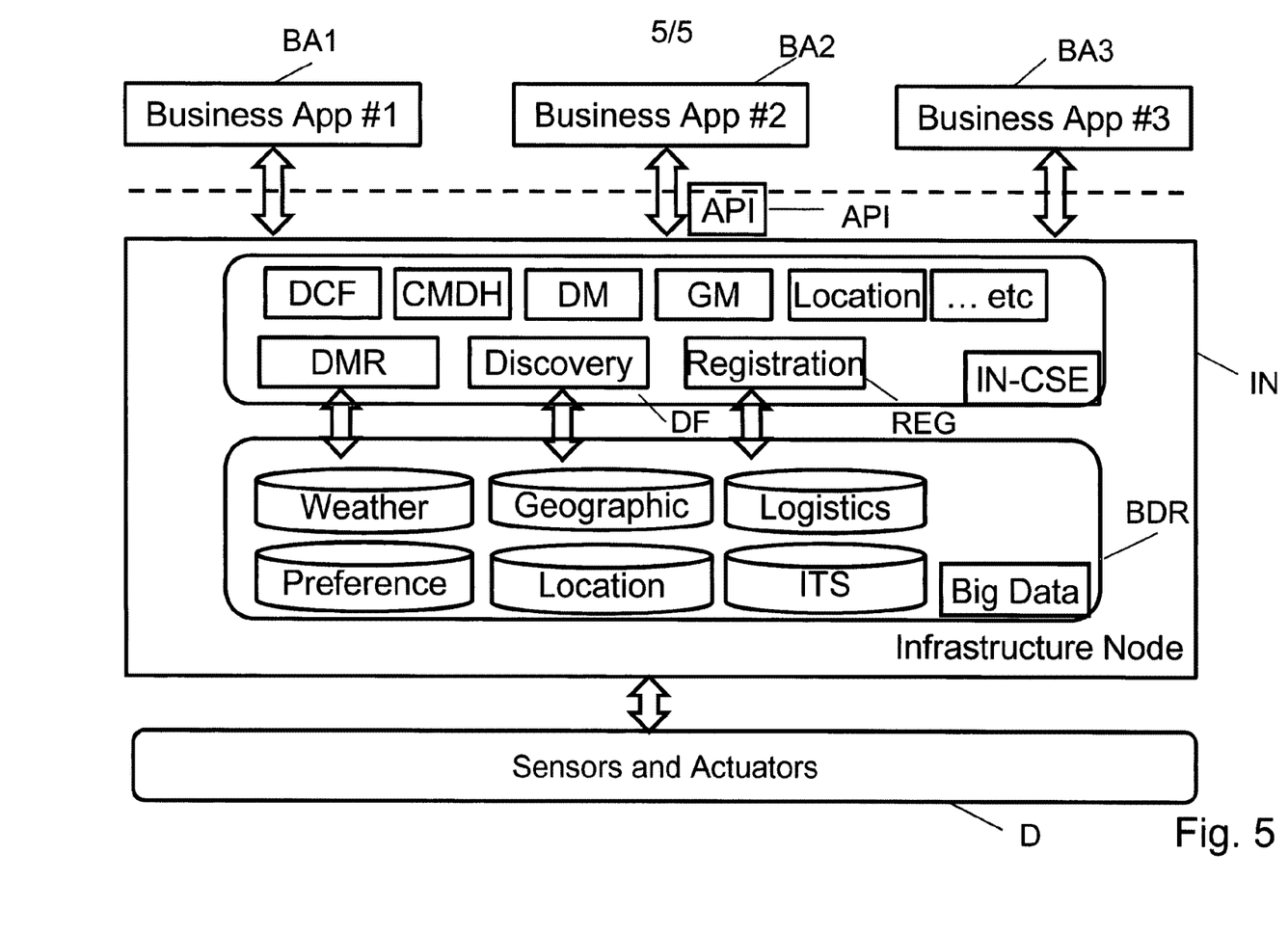
FIG. 5 shows a schematic view of a system according to a third embodiment of the present invention.

FIG. 5 shows a schematic view of a system according to a third embodiment of the present invention. In FIG. 5 an implementation of a third embodiment of the present invention into the oneM2M standardization architecture is shown. Different business applications BA1, BA2 and BA3 communicate via an application programming interface API with an infrastructure node IN comprising common service functions CSF according to the oneM2M architecture. The infrastructure node IN comprises one or more BigData repositories BDR, a discovery function DF and a registration function REG in the infrastructure common service entity IN-CSE. The device management and repository common service function DMR, the discovery function DF and the registration function REG communicate with the BigData repository BDR. The infrastructure node IN is further connected to sensors and actuators, depicted with reference sign D in FIG. 5.

The device management and repository common service function DMR by means of the virtual device resource VDR provides access to an analytics function of the BigData repository BDR, so that BigData-specific analytics can be provided. Further the device management and repository common service function DMR communicates with the BigData platforms or internal BigData repositories for performing the analytics. The BigData repository can be an internal part of the infrastructure common service entity or can be located externally as indicated in FIG. 5. These communications are performed via virtual device resources VDR and the device management and repository common service function DMR-CSF may provide means for performing analytics on large amount of data, so that service providers may provide added services to applications BA1, BA2, BA3. The device management and repository common service function DMR-CSF may be responsible for enabling applications to discovery and use analytics based on larger amount of data from different sources.

The discovery function DF in FIG. 5 preferably receives a request from one of the business applications BA1, BA2 or BA3 and sends the request to the device management in repository common service function DMR and/or BigData database BDR to get search results. The discovery function DF preferably supports any combinations between an internal device management and repository data and BigData discovery. If a BigData repository is provided, then the discovery common service function DF is preferably able to send queries comprising the request to the device management and repository common service function DMR or the BigData repository BDR to get the results of analytics. Returned results from the DMR discovery are already described by the one M2M platform. Returned from BigData analytics preferably comprises possible services and/or information that the BigData repository BDR can support using its data set and analytics capabilities. The results from the BigData discovery are used to propose possible virtual device resources VDR to the business applications BA1, BA2 or BA3.

The registration REG creates and/or authenticates virtual device resources VDR for BigData analytics, so that the virtual device resources are made known to the machine-to-machine platform. The device management and repository common service function DMR can request a virtual device resource VDR registration to the registration REG. The registration common service function REG is preferably able to register a virtual device resource VDR comprising queries for performing BigData analytics with its local common service entity for registering its properties and/or attributes. Further frequent BigData analytics returned to discovery requests may be registered as a virtual device resource VDR in order to provide prompt analytics results. Even further discovery request results are selected by the registration common service function REG of virtual device resources VDR including analytics logic of the selected result or results.

In summary, an embodiment of the present invention enables a discovery and negotiation mechanism for in particular machine-to-machine applications enabling integrating BigData analytics into machine-to-machine systems by means of a generation of virtual device resources. An embodiment of the present invention further enables the discovery of options for generating virtual device resources, a negotiation between requesting applications, preferably machine-to-machine applications and machine-to-machine systems which virtual device resources should be created. Even further, an embodiment of the present invention enables a dynamic generation of the virtual device resources.

An embodiment of the present invention further enables analytics of large amount of data in machine-to-machine platforms, enables machine-to-machine platform to interwork with BigData platforms and the device resources are preferably to be used to provide analytics from large amounts of data sets.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for one or more applications to utilize one or more BigData repositories via a virtual device resource, the method including:
   receiving, by a discovery function device, a request for discovery of information from the one or more applications;
   converting, by the discovery function device, the received request into one or more requests which are compatible with the one or more BigData repositories to facilitate the converted one or more requests being processed by the one or more BigData repositories;
   transmitting, by the discovery function device, converted one or more requests to the one or more BigData repositories for processing by the one or more BigData repositories;
   receiving, by the discovery function device, one or more processing results from the one or more Big Data repositories based on the one or more BigData repositories processing the converted one or more requested;
   converting, by the discovery function device, the received one or more processing results into one or more descriptions of dynamically creatable virtual device resources;
   transmitting, by the discovery function device, the one or more descriptions of dynamically creatable virtual device resources to the one or more applications to facilitate the one or more applications selecting one or more virtual device resources to be created by the discovery function device based on the one or more descriptions of dynamically creatable virtual device resources;
   receiving, by the discovery function device, a selection of one or more virtual device resources to be created by the discovery function device; and
   generating, by the discovery function device, the selected one or more virtual device resources to facilitate the one or more applications utilizing the one or more BigData repositories via the one or more virtual device resources.

2. The method according to claim 1, wherein prior to converting the received request into one or more request which are compatible with the one or more BigData repositories, the method further comprises receiving the request for discovery of information from the one or more applications at least a predetermined number of times within a predefined time period.

3. The method according to claim 1, wherein device resource information is added to the generated one or more virtual device resources.

4. The method according to claim 1, further comprising:
   transmitting, by the discovery function device, an acknowledgement of generation of the generated one or more virtual devices resources to the one or more applications.

5. The method according to claim 1, wherein the generated one or more virtual device resources provide analytic functions corresponding to the one or more BigData repositories.

6. The method according to claim 5, wherein providing the analytic functions includes providing a resource or an attribute.

7. The method according to claim 6, wherein providing the resource or the attribute includes providing a result, a query, association information, a filtering rule and/or a semantic description.

8. The method according to claim 7, wherein the result is updated periodically and/or in response to an update request.

9. The method according to claim 1, further comprising: predicting a future discovery request based on one or more previous requests for discovery of information.

10. The method according to claim 1, wherein the one or more applications are part of a machine-to-machine (M2M) platform, and the one or more applications are M2M applications.

11. A system, comprising:
one or more devices configured to execute one or more applications to generate a request for discovery of information and to transmit the request for discovery of information to a discovery function device;
the discovery function device, configured to convert the request for discovery of information into one or more requests which are compatible with one or more BigData repositories and to transmit the converted one or more requests to the one or more BigData repositories; and
the one or more BigData repositories, configured to process the converted one or more requests to generate one or more processing results and to transmit the one or more processing results to the discovery function device;
wherein the discovery function device is further configured to convert the one or more processing results into one or more descriptions of dynamically creatable virtual device resources and to transmit the one or more descriptions of dynamically creatable virtual device resources to the one or more devices configured to execute the one or more applications;
wherein the one or more devices are further configured to execute the one or more applications to select one or more virtual device resources to be created by the discovery function device based on the one or more descriptions of dynamically creatable virtual device resources and to transmit the selection of one or more virtual device resources to be created by the discovery function device to the discovery function device;
wherein the discovery function device is configured to generate the selected one or more virtual device resources to facilitate the one or more applications utilizing the one or more BigData repositories via the one or more virtual device resources.

12. A non-transitory computer-readable medium having processor-executable instructions stored thereon for one or more applications to utilize one or more BigData repositories via a virtual device resource, wherein the processor-executable instructions, when executed, facilitate performance of the following:
receiving, by a discovery function device, a request for discovery of information from the one or more applications;
converting by the discovery function device, the received request into one or more requests which are compatible with the one or more BigData repositories to facilitate the converted one or more requests being processed by the one or more BigData repositories;
transmitting, by the discovery function device, the converted one or more requests to the one or more BigData repositories for processing by the one or more BigData repositories;
receiving, by the discovery function device, one or more processing results from the one or more BigData repositories based on the one or more BigData repositories processing the converted one or more requested;
converting, by the discovery function device, the received one or more processing results into one or more descriptions of dynamically creatable virtual device resources;
transmitting, by the discovery function device, the one or more descriptions of dynamically creatable virtual device resources to the one or more applications to facilitate the one or more applications selecting one or more virtual device resources to be created by the discovery function device based on the one or more descriptions of dynamically creatable virtual device resources;
receiving, by the discovery function device, a selection of one or more virtual device resources to be created by the discovery function device; and
generating by the discovery function device, the selected one or more virtual device resources to facilitate the one or more applications utilizing the one or more BigData repositories via the one or more virtual device resources.

* * * * *